United States Patent
Lei et al.

(10) Patent No.: US 7,595,935 B2
(45) Date of Patent: Sep. 29, 2009

(54) ROD LENS

(75) Inventors: Fang Lei, Durchhausen (DE); Markus Kupferschmid, Emmingen-Liptingen (DE)

(73) Assignee: Karl Storz GmbH & Co. KG (DE)

( * ) Notice: Subject to any disclaimer, the term of this patent is extended or adjusted under 35 U.S.C. 154(b) by 107 days.

(21) Appl. No.: 11/450,819

(22) Filed: Jun. 9, 2006

(65) Prior Publication Data
US 2006/0281974 A1    Dec. 14, 2006

(30) Foreign Application Priority Data
Jun. 9, 2005 (DE) .................. 10 2005 027 880

(51) Int. Cl.
*G02B 3/12* (2006.01)
(52) U.S. Cl. .................. 359/665; 349/5; 349/8
(58) Field of Classification Search .......... 359/665; 349/5, 8, 160
See application file for complete search history.

(56) References Cited

U.S. PATENT DOCUMENTS

| | | | |
|---|---|---|---|
| 3,364,816 A | 1/1968 | Jeffree | |
| 3,531,185 A | 9/1970 | Buchsbaum et al. | ......... 350/179 |
| 4,168,882 A | 9/1979 | Hopkins | |
| 4,679,911 A * | 7/1987 | Jacobs et al. | ................ 349/200 |
| 5,425,045 A * | 6/1995 | Hamatani | ..................... 372/101 |
| 5,682,263 A | 10/1997 | Robb et al. | ................. 359/355 |
| 5,892,625 A | 4/1999 | Heimer | ....................... 359/665 |
| 6,212,015 B1 | 4/2001 | Heimer | |
| 6,496,246 B1 * | 12/2002 | Spinali | ........................ 355/67 |
| 2007/0146904 A1 * | 6/2007 | Webb | ......................... 359/796 |

FOREIGN PATENT DOCUMENTS

| | | |
|---|---|---|
| DE | 1 804 889 | 5/1969 |
| DE | 1299520 B | 7/1969 |
| DE | 2619393 A1 | 11/1976 |
| GB | 468227 A | 7/1937 |
| WO | 9535522 A1 | 12/1995 |

* cited by examiner

*Primary Examiner*—Timothy J Thompson
(74) *Attorney, Agent, or Firm*—St. Onge Steward Johnston & Reens LLC

(57) ABSTRACT

A rod lens comprises a tubular body having a first end, a second end, a length and a diameter, a first optically transparent closing element, tightly sealing the first end of the tubular body, a second optical transparent closing element, tightly sealing the second end of the body. The rod lens further comprises n further optical elements being positioned within the tubular body defining n+1 chambers in the tubular body, with n being an integer >0, and n+1 optical fluids being positioned in the n+1 chambers, with each of the n+1 optical fluids being positioned in one of the n+1 chambers, whereby at least one of the n+1 optical fluids having a refractive index different from the other n+1 optical fluids.

12 Claims, 3 Drawing Sheets

ROD LENS

CROSS-REFERENCE TO RELATED APPLICATIONS

This application claims priority of German patent application No. 10 2005 027 880.9 filed on Jun. 9, 2005.

BACKGROUND OF THE INVENTION

The present invention relates to a rod lens and an endoscope comprising at least one such rod lens.

Rod lenses per se are known and are for example used by the applicant under the designation "Hopkins Optics" in rigid endoscopes.

Rod lenses in general consist of a cylindrical body made from glass whereby the opposite circular ends are machined in order to form optical elements. The length of their body is usually many times bigger than their diameter.

Rod lenses have got the advantage that they conduct light for example in an endoscope with a higher efficiency than can be achieved with conventional plate-shaped lenses between which relatively large pockets of air exist.

Rod lenses made of glass have got the disadvantage, though, that they always form rigid bodies and cannot be used in flexible endoscopes. Therefore, in general, bundles of fiber optic picture guides are used in flexible endoscopes. Such bundles of fiber optic picture guides have got the disadvantage that they create a pixelated picture which reduces the precision of the representation notably.

Rod lenses made from glass further have got the disadvantage that they are made from a brittle material. During their daily use for example in an optical system of an endoscope, they will be dropped every now and then, leading to splinters coming off or even to the breakage of the rod lens. Such damage renders the optical system unusable. In such cases usually the complete optical system must be replaced.

In order to compensate for those disadvantages of rod lenses made of glass, flexible liquid filled rod lenses have been developed.

One example for such a flexible rod lens is known from U.S. Pat. No. 5,892,625. Such a rod lens comprises a tubular body which is tightly sealed on both ends by closing elements. Between those closing elements there is disposed a transparent fluid such as water or an optical fluid. In this way rod lenses are created which show at least some degree of flexibility. It has often proven difficult though to adjust such rod lenses to the desired optical characteristics.

SUMMARY OF THE INVENTION

It is therefore an object of the invention to describe a fluid-filled rod lens with which optical aberrations can be corrected in a simple and economical fashion.

The applicant has now found that through the formation of different chambers in such a fluid-filled rod lens which are filled with liquid or gel-like optical media having different refractive indices the optical characteristics of a fluid-filled rod lens can be adjusted in a simple but highly precise fashion. In this way optical aberrations e.g. in an endoscope can be corrected.

According to one aspect of the invention, a rod lens is provided comprising a tubular body having a first end, a second end, a length and a diameter, a first optically transparent closing element, tightly sealing said first end of said tubular body, a second optically transparent closing element, tightly sealing said second end of said tubular body, n further optical elements being positioned within said tubular body defining n+1 chambers in said tubular body, with n being an integer >0, and n+1 optical fluids being positioned in said n+1 chambers, with each of said n+1 optical fluids being positioned in one of said n+1 chambers, whereby at least one of the n+1 optical fluids has a refractive index different from the other n+1 optical fluids.

According to another aspect of the invention an endoscope comprising at least one such rod lens is provided.

The expression "optical fluid" as used herein comprises all liquid and gel-like optical media.

The expressions "first optically transparent closing element", "second optically transparent closing element", "first further optical element", "second further optical element", "first optical fluid" "second optical fluid" etc. as used herein solely serve to distinguish the closing elements, further optical elements or the optical fluids respectively from each other and they are no indications towards their position relative to one another or other characteristics.

The expression "further optical element" as used herein designates every transparent element which can tightly separate two chambers within the tubular body.

Since the refractive index of optical fluids can be precisely controlled and since the optical fluids can easily be introduced into the rod lens or removed therefrom, the rod lenses according to the invention can be adjusted to the desired optical characteristics in a notably simpler and more precise fashion.

Therefore in many cases the use of such rod lenses can make the use of expensive optical elements such as achromatic lenses redundant.

The tubular body of the rod lens can hereby have any shape as long as it comprises an internal hollow space and two openings opposite to each other. The cross-section of the tubular body will usually be circular but it can also be oval, elliptical or polygonal.

The tubular body can be made from any material as long as this material is impervious towards the optical fluid contained therein. Examples for materials used for making the tubular body include plastics or metals.

The closing elements and the further optical elements can also be made from any material as long as it is impervious towards the optical fluid contained within the tubular body as well as optically transparent. Examples for materials used for making the closing elements or the further optical elements include glasses or plastics.

The tubular body can be connected to the closing elements and the further optical elements by all means known to a man of the art as long as a connection is formed which is impervious against the enclosed optical fluids. Examples for connections include those that can be achieved by gluing, cementing, welding, crimping or by shrinking the tubular body onto the closing elements or the further optical elements respectively.

The closing elements and the further optical element can also be first inserted into a metallic tube and a tube-like shrinkable material can be mounted on top of the assembly in order to improve the seal.

The optical fluid can be any known liquid or gel-like optical medium as long as its refractory index is bigger than that of air. Examples for such optical fluids include materials such as those commercially available from Cargille Laboratories Cedar Grove, N.J., USA.

Preferably the optical media should comprise substances which are stable over long periods of time.

The n+1 optical fluids contained in the n+1 chambers can be exclusively liquid or exclusively gel-like optical media as well as any combination of liquid and gel-like media.

In an embodiment of the invention the tubular body consists of a flexible material.

This measure increases the fracture-resistance of a rod lens.

Due to the construction of the body from a flexible material the whole rod lens can be made flexible and used for example in flexible endoscopes instead of bundles of optical fibers.

In a further embodiment of the invention tubular body is made from plastic.

This has got the advantage that the tubular body is light as well as highly fracture-resistant.

In a further embodiment of the invention the length of the tubular body is bigger than the diameter of the tubular body especially at least three times as big.

Such ratios of length of the tubular body to diameter result especially in their use in an endoscope in particularly advantageous optical characteristics.

In a further embodiment of the invention at least one of n+1 the optical fluids has a refractive index of more than 1.3, preferably all of the n+1 optical fluids have a refractive index of more than 1.3.

The conduction of light in an optical medium is proportional to the square of the refractive index of that optical medium. This means that the higher the refractive index the better the transmission of light. Through the above measure the transmission of light in the rod lens is notably improved.

In a further embodiment at least one of the closing elements is designed as an optical element and preferably both closing elements are designed as optical elements.

This measure has got the advantage that the closing elements can not only be used to contain the optical media within the tubular body but they can also be used to adjust the optical characteristics of the rod lens to the respective application.

In a further embodiment of the invention at least one of the n further optical elements is a lens.

This measure has got the advantage that the further optical elements cannot only be used to separate the optical fluids but they can also be used to adjust the optical characteristics of the rod lens to the respective application.

In a further embodiment of the invention at least one of the n further optical elements is an optically transparent membrane.

Such an optically transparent membrane can thereby be curved or planar.

This measure has got the advantage that an optically transparent membrane is very light leading to a notably lighter rod lens. The use of a curved membrane further provides another possibility for optical corrections.

Such an optically transparent membrane itself further has got only very little influence on the optical characteristics of the rod lens so no additional errors are generated thereby which would then have to be corrected again with other optical elements or the optical fluids.

In an endoscope with several further optical elements these can be any combination of lenses, optically transparent membranes and other optical elements.

In a further embodiment of the invention n=1.

It has been found that in many cases one further optical element and therefore two chambers for the optical fluids are sufficient to achieve the desired characteristics.

Therefore this creates a constructively simple and easy to manufacture rod lens.

It will be appreciated that the features mentioned above and those still to be mentioned below can be used not only in the cited combination but also in other combinations or on their own without departing from the scope of the present invention.

BRIEF DESCRIPTION OF THE DRAWINGS

Illustrative embodiments of the invention are now explained in more detail in the following description and depicted in the drawings in which.

DETAILED DESCRIPTION OF PREFERRED EMBODIMENTS

Figure 1:
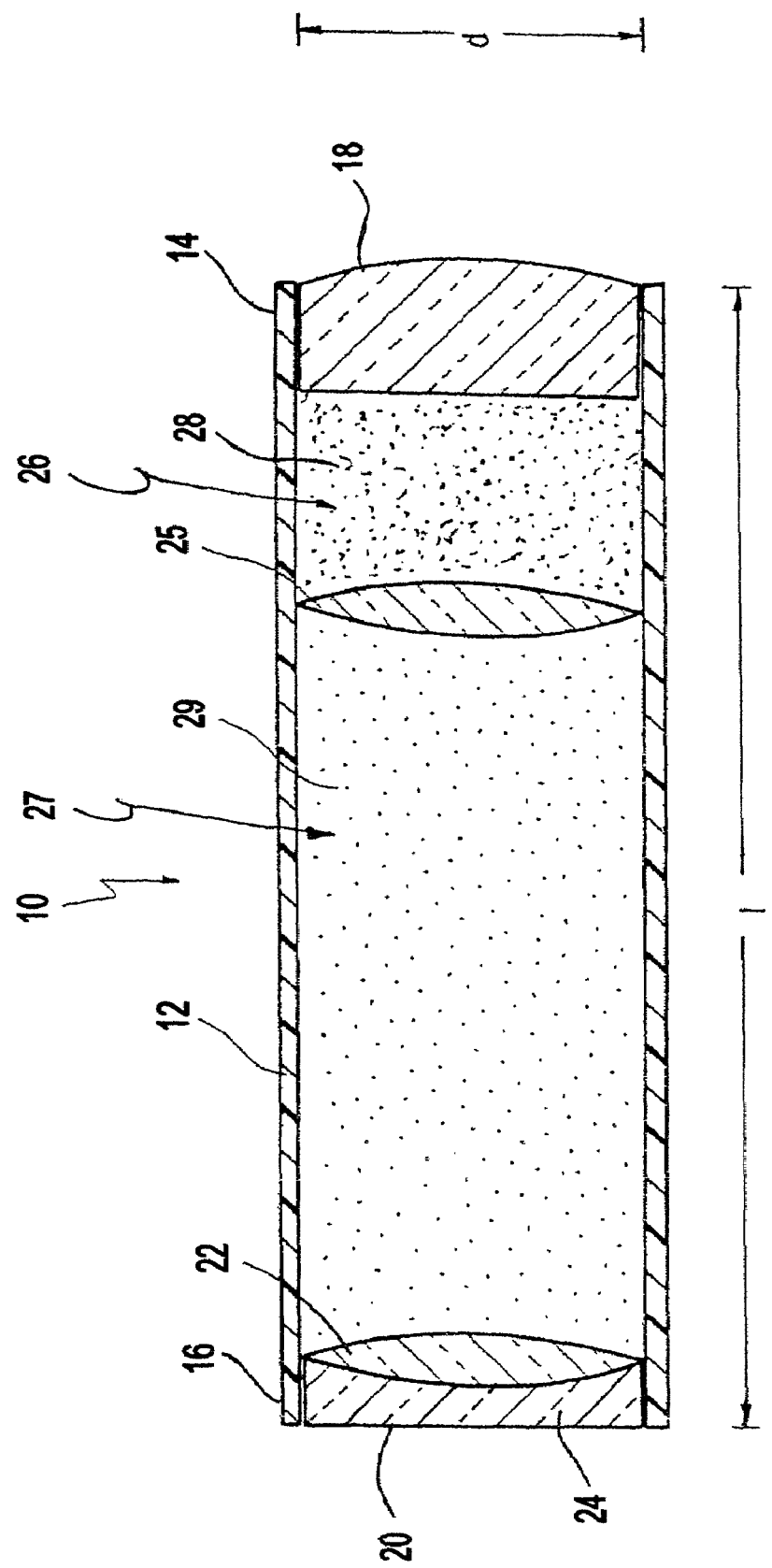
FIG. 1 shows a longitudinal section of a first embodiment of a fluid-filled rod lens.

In FIG. 1 a fluid-filled rod lens in its entirety is designated with the reference numeral 10.

The rod lens 10 comprises a tubular body 12 with a first end 14 and a second end 16. The tubular body 12 is hereby made from a shrinkable plastic.

On the first end 14 the body 12 is sealed by a first optically transparent closing element 18 which is designed here as a lens. The body 12 was connected tightly to the closing element 18 by shrinking the plastic onto the closing element 18.

On the second end 16 the body 12 is sealed by a second optically transparent closing element 20. This second closing element 20 was also connected tightly to the body 12 by shrinking the plastic of body 12 onto the second closing element 20.

The second closing element 20 is here designed as an achromatic lens and comprises a collecting lens 22 and a dispersing lens 24. The collecting lens 22 is thereby made from crown glass and the dispersing lens 24 is made from flint glass. This combination of lens and lens material leads to chromatic aberrations which can occur when polychromatic light is transmitted through a rod lens being corrected.

Between the first closing element 18 and the second closing element 20 a further optical element 25 is positioned within the body 12 which is here designed as a lens. Since only one further optical element 25 is present n=1. This optical element 25 has also been connected tightly to the tubular body 12 by shrinking the plastic of the tubular body 12 onto the optical element 25. Through this tight connection two (n+1) chambers are created which are completely separated from each other. The two chambers are in their circumference delimited by the tubular body 12. A first chamber 26 is on one side delimited by the first closing element 18 and on the other side by the further optical element 25. A second chamber 27 is delimited on one side by the further optical element 25 and on the other side by the second closing element 20.

In the instance shown here the two chambers 26 and 27 have different sizes but it is obvious to a man of the art that the dimensions of the two chambers 26 and 27 can have any ratio to each other.

A first optical fluid 28 is filled into the first chamber 26 and a second optical fluid 29 is filled into the second chamber 27.

The two optical fluids 28 and 29 are in this instant both optical liquids. These optical liquids are immersion liquids which are commercially available from Cargille Laboratories Cedar Grove, N.J., USA under formula codes 4550 and 50350.

The dimensions of the chambers 26 and 27 as well as the refractive indices of the optical fluids 28 and 29 are hereby matched in such a way that the desired optical characteristics of the rod lens 10 are achieved.

The body 12 has got a length L and an internal diameter D. Length L is about 3.5 times bigger than diameter D so that for use in a shaft of an endoscope a suitable cylindrical shape and excellent optical performance is achieved.

Figure 2:
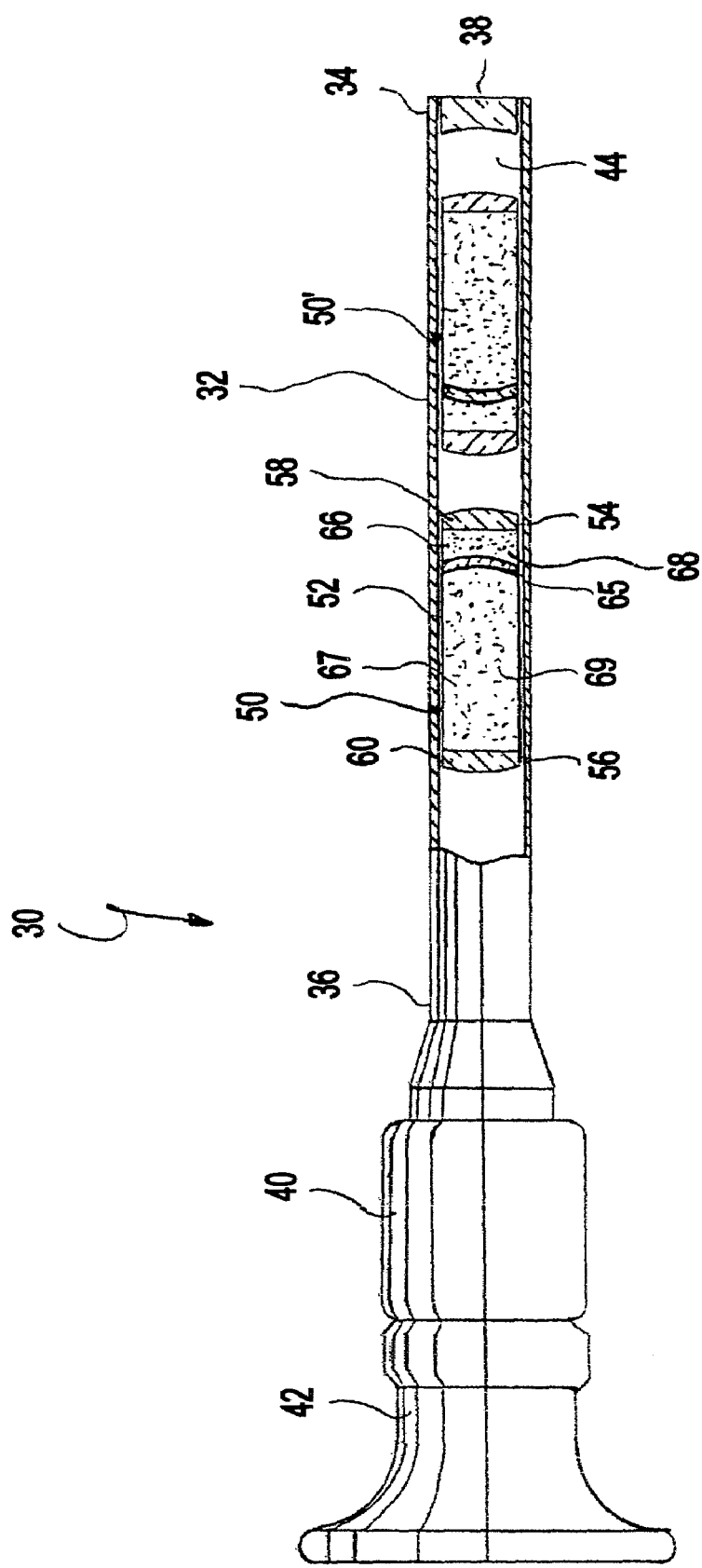
FIG. 2 shows an endoscope comprising fluid-filled rod lenses in a partial section.

In FIG. 2 an endoscope in its entirety is designated with the reference numeral 30.

The endoscope 30 comprises a shaft 32 with a distal end 34 and a proximal end 36.

Shaft 32 is sealed tightly at its distal end 34 by a closing element 38, the closing element 38 being designed as a lens here.

At its proximal end 36 shaft 32 terminates in a head 40 of the endoscope 30 to which is connected an ocular 42.

The inside of the shaft 32 forms an optical tube 44 of the endoscope 30. Through the optical tube 44 light from the distal end 34 of the shaft is conducted to the ocular 42.

Fluid-filled rod lenses are positioned within the optical tube 44, two of which 50 and 50' are shown here which are of identical design. Rod lens 50' is turned 180° in relation to rod lens 50. It is also possible to have more rod lenses which can be the same or different.

One of the two rod lenses 50 and 50' will now be described as an example.

The rod lens 50 comprises a tubular body 52 consisting here of metal. The tubular body 52 comprises a first end 54 and a second end 56.

The tubular body 52 is sealed off at its first end 54 by a first optically transparent closing element 58 which is here designed as a lens. The first closing element 58 is thereby cemented into the tubular body 52 in order to create a tight connection.

The tubular body 52 is sealed off at its second end with a second optically transparent closing element 60 which is here also designed as a lens. The second closing element 60 is hereby cemented into the tubular body 52 in order to create a tight connection.

Within the tubular body 52 there is further disposed a further optical element 65 which is here designed as a curved optically transparent membrane. This optically transparent membrane is glued to the tubular body 52 in order to form a tight connection between the tubular body 52 and the further optical element 65. The further optical element 65 divides the tubular body 52 into a first chamber 66 and a second chamber 67. Therefore n=1 in this case.

The two chambers 66 and 67 are in their circumference delimited by the tubular body 52. The first chamber 66 is delimited on one side by the first closing element 58 and on the other side by the further optical element 65. The second chamber 67 is delimited on one side by the further optical element 65 and on the other side by the second closing element 60.

A first optical fluid 68 is disposed in the first chamber 66 and a second optical fluid 69 is disposed in the second chamber 67.

The two optical fluids are transparent optical gels which are commercially available from Cargille Laboratories Cedar Grove, N.J., USA under gel codes 0607 and 0608.

The optical characteristics of the two optical fluids are adjusted to each other so that optical aberrations such as chromatic aberrations are corrected and an achromatic lens is no longer needed in this rod lens.

In order to produce such a rod lens 50 the further optical element 65 is glued into the tubular body 52. After that the first optical fluid 68 is filled into the first chamber 66 on the right hand side of this drawing. After that the first closing element 58 is inserted into the tubular body 52 making sure that no air bubbles are present in this first optical fluid 68. The closing element 58 is then tightly cemented into the tubular body 52.

In a second step the second optical fluid 69 is filled into the second chamber 67 on the left hand side of this drawing. After this the second closing element 60 is inserted into the tubular body 52 making sure that no air bubbles are present in the second optical fluid 69. The second closing element 60 is then cemented tightly into the tubular body 52 so that in all a tight optically transparent fluid-filled rod lens 50 is formed. Such a rod lens can be built into the endoscope 30 in the same way as a known rod lens made from glass.

The filling of the rod lens can also take place after inserting and connecting the two closing elements and the further optical element with body 52 for example by radial openings in body 52 which are then closed.

Furthermore a tube can be shrunk onto the rod lens 50 in order to provide further measures to ensure lasting seal.

Figure 3:
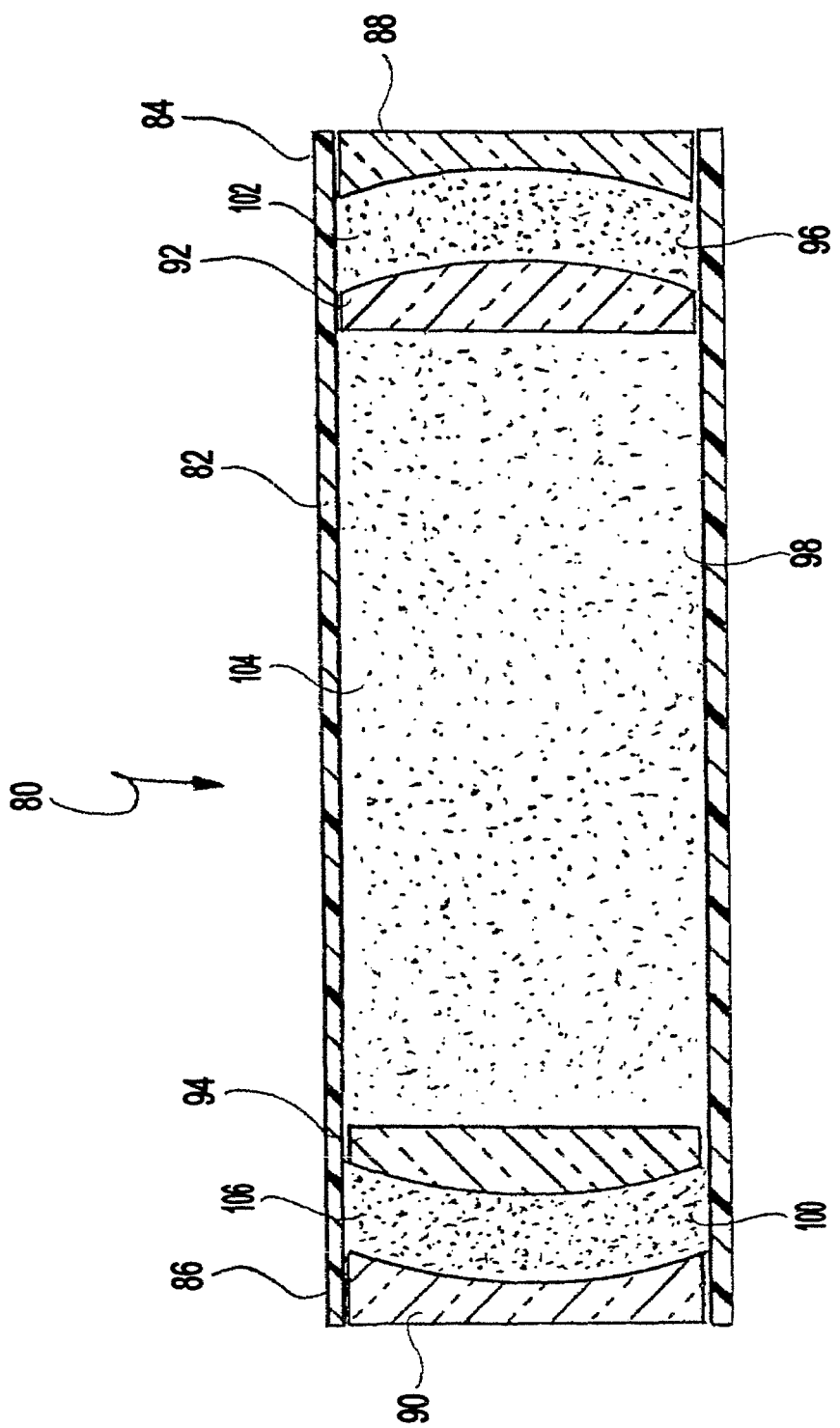
FIG. 3 shows a longitudinal section of a further embodiment of a fluid-filled rod lens.

In FIG. 3 a rod lens is designated in its entirety with the reference numeral 80.

Rod lens 80 comprises a tubular body 82 made from a flexible plastic having a first end 84 and a second end 86.

At the first end 84 the tubular body is tightly sealed by a first closing element 88 which is here designed as a lens. The first closing element 88 has been glued into the tubular body 82 in order to provide a tight connection.

At the second end 86 the tubular body 82 is tightly closed by a second closing element 90 which is here designed as a lens. The second closing element 90 has been glued into tubular body 82 in order to ensure a tight connection.

Arranged within the tubular body 82 is a first further optical element 90 and a second further element 94. Therefore in this case n=2. The first optical element 92 and the second optical element 94 have been both glued into the tubular body 82 in order to provide a tight connection.

The first closing element 88 and the first further optical element 92 together with the tubular body 82 define a first chamber 96. The first further optical element 92 and the second further optical element 94 together with the tubular body 82 define a second chamber 98. The second further optical element 94 and the second closing element 90 together with the tubular body 82 define a third chamber 100.

The first chamber 96 is filled with a first optical fluid 102 which in this case is an immersion liquid commercially available from Cargille Laboratories, Cedar Grove, N.J., USA under code number 50350 with a refractive index of 1.475.

The second chamber 98 is filled with a second optical fluid 104. The second optical fluid 104 is an optical gel which is commercially available from Cargille Laboratories, Cedar Grove, N.J., USA under code number 0607. This optical gel has a refractive index of 1.457.

The third chamber 100 is filled with a third optical fluid 106 which in this case is the same immersion liquid as has been used for the first optical fluid 102.

This leads to a symmetrical rod lens with three fluid-filled chambers.

The first closing element 88, the first optical fluid 102 in the first chamber and the first further element 92 form a lens triplet which acts as an achromatic lens. The second further optical element 94, the third optical fluid 106 in this third chamber 100 and the second closing element 90 also form a lens triplet which acts as an achromatic lens.

Although the three-chambered rod lens 80 here is symmetrical it is obvious to a man of the art that this must not necessarily be the case and the ratio of the dimensions of the first chamber 96, the second chamber 98 and the third chamber 100 relative to each other can be varied in order to adapt the rod lens to the desired optical properties.

What is claimed is:

1. A rod lens comprising a tubular body having a first end, a second end, a length and a diameter,
    a first optically transparent closing element, tightly sealing said first end of said tubular body,
    a second optically transparent closing element, tightly sealing said second end of said body,
    n further optical elements being positioned within said tubular body defining n+1 chambers in said tubular body, with n being an integer >0, and
    n+1 optical fluids being positioned in said n+1 chambers, with each of said n+1 optical fluids being positioned in one of said n+1 chambers, whereby at least one of said n+1 optical fluids has a refractive index different from the other n+1 optical fluids, and whereby at least one of said n+1 optical fluids has a refractive index of more than 1.3.

2. The rod lens of claim 1 wherein said tubular body is made from a flexible material.

3. The rod lens of claim 1 wherein said tubular body is made from plastic.

4. The rod lens of claim 1 wherein said length of said tubular body is bigger than said diameter of said tubular body.

5. The rod lens of claim 4 wherein said length of said tubular body is at least three times as big as said diameter of said tubular body.

6. The rod lens of claim 1, wherein all of said n+1 optical fluids have a refraction index of more than 1.3.

7. The rod lens of claim 1, wherein at least one of said two closing elements is an optical element.

8. The rod lens of claim 7, wherein both said closing elements are optical elements.

9. The rod lens of claim 1, wherein at least one of said n further optical elements is a lens.

10. The rod lens of claim 1, wherein at least one of said n further optical elements is an optical transparent membrane.

11. The rod lens of claim 1, wherein n=1.

12. An endoscope comprising at least one rod lens of claim 1.

* * * * *